(12) United States Patent
Ries

(10) Patent No.: US 8,058,758 B2
(45) Date of Patent: Nov. 15, 2011

(54) APPARATUS FOR MAGNETIC BEARING OF ROTOR SHAFT WITH RADIAL GUIDANCE AND AXIAL CONTROL

(75) Inventor: Günter Ries, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 276 days.

(21) Appl. No.: 11/988,037

(22) PCT Filed: Jun. 22, 2006

(86) PCT No.: PCT/EP2006/063438
§ 371 (c)(1),
(2), (4) Date: May 22, 2009

(87) PCT Pub. No.: WO2007/000405
PCT Pub. Date: Jan. 4, 2007

(65) Prior Publication Data
US 2009/0295244 A1    Dec. 3, 2009

(30) Foreign Application Priority Data
Jun. 28, 2005  (DE) .......................... 10 2005 030 139

(51) Int. Cl.
*H02K 7/09* (2006.01)
*F16C 39/06* (2006.01)
*F16C 32/04* (2006.01)

(52) U.S. Cl. ...... 310/90.5; 310/90; 310/68 B; 310/68 C; 310/68 D

(58) Field of Classification Search .................. 310/90.5; *H02K 7/09; F16C 39/06, 32/04*
See application file for complete search history.

(56) References Cited

U.S. PATENT DOCUMENTS

| | | | |
|---|---|---|---|
| 3,865,442 | A | 2/1975 | Studer |
| 3,954,310 | A | 5/1976 | Rava |
| 3,976,339 | A | 8/1976 | Sabnis |
| 4,268,095 | A | 5/1981 | Millner |
| 4,322,624 | A | 3/1982 | Cornelissen |
| 4,370,004 | A | 1/1983 | Morikawa et al. |
| 4,620,752 | A | 11/1986 | Fremerey et al. |

(Continued)

FOREIGN PATENT DOCUMENTS

DE    30 11 415    10/1980

(Continued)

OTHER PUBLICATIONS

Machine translation of 1028262 Schob.*

(Continued)

*Primary Examiner* — Quyen Leung
*Assistant Examiner* — Terrance Kenerly
(74) *Attorney, Agent, or Firm* — Staas & Halsey LLP

(57) ABSTRACT

Radial, soft magnetic rotor disk elements which engage in each other and soft magnetic stator disk elements form a magnetic bearing device. The elements are provided with teeth-like extensions which are arranged opposite to each other over an air gap on sides which are oriented towards each other. Magnetic fields, which may be produced by permanent magnets or electromagnets, are assigned to the stator disk elements to produce a magnetic maintaining flow which is oriented in an axial direction between the disk elements for radial adjustment. An electromagnetic winding is also provided in the region of the central plane of the bearing device for axial adjustment, which enables a magnetic control flow, which superimposes the magnetic maintaining flow, to be produced.

13 Claims, 3 Drawing Sheets

U.S. PATENT DOCUMENTS

| | | | |
|---|---|---|---|
| 4,710,656 | A | 12/1987 | Studer |
| 6,727,618 | B1 * | 4/2004 | Morrison ................ 310/90.5 |
| 6,856,062 | B2 * | 2/2005 | Heiberger et al. ........ 310/178 |
| 2008/0164776 | A1 * | 7/2008 | Yoshimatsu ............. 310/90.5 |

FOREIGN PATENT DOCUMENTS

| | | |
|---|---|---|
| DE | 30 11 415 A1 | 10/1980 |
| DE | 34 09 047 A1 | 9/1985 |
| DE | 38 44 563 C2 | 11/1989 |
| DE | 44 36 831 C2 | 6/1995 |
| EP | 1 028 262 A1 | 8/2000 |
| FR | 2 271 441 | 12/1975 |
| JP | 58-137618 | 8/1983 |
| JP | 59-200810 A | 11/1984 |
| JP | 9-133133 A | 5/1997 |

OTHER PUBLICATIONS

Machine translation of 2271441 Thomin.*
Thomin, No title available, Dec. 1975.*
International Search Report for Application No. PCT/EP2006/063438; mailed Jan. 22, 2007.
Office Action issued in corresponding German Patent Application No. 102005030139.8; mailed on Mar. 16, 2005.

* cited by examiner

APPARATUS FOR MAGNETIC BEARING OF ROTOR SHAFT WITH RADIAL GUIDANCE AND AXIAL CONTROL

CROSS REFERENCE TO RELATED APPLICATIONS

This application is based on and hereby claims priority to German Application No. 10 2005 030 139.8 filed on Jun. 28, 2005, the contents of which are hereby incorporated by reference.

BACKGROUND

Described below is a device for magnetic bearing of a rotor shaft with respect to a stator having the following features:
- a) a first bearing part is connected to the rotor shaft and is surrounded by a second bearing part, which is associated with the stator, with a distance between them,
- b) the first bearing part contains rotor disk elements which are aligned at right angles to the axis of the rotor shaft, are arranged one behind the other in the direction of the axis and are each separated, forming an intermediate space,
- c) the second bearing part contains stator disk elements, which are aligned at right angles to the rotor shaft axis, are arranged one behind the other in the direction of the rotor axis, are at a distance from one another and each project into one of the intermediate spaces of adjacent rotor disk elements,
- d) a magnetic flux directed essentially in the axial direction is formed between the elements.

A corresponding bearing device is disclosed, for example, in DE 38 44 563 C2.

Magnetic bearing devices allow non-contacting and wear-free bearing of moving parts. They require no lubricants and can be designed to have low friction. Known radial and axial magnetic bearing devices use magnetic forces between stationary electromagnets of a stator and ferromagnetic elements which rotate jointly of a rotor body. The magnetic forces are always attractive in the case of this bearing type. In principle, this means that it is impossible to achieve an inherently stable bearing in all three spatial directions. Magnetic bearing devices such as these therefore require active bearing regulation, controlling the currents of electromagnets by position sensors and control loops and counteracting discrepancies of the rotor body from its nominal position. The multichannel regulation to be carried-out requires complex power electronics. Corresponding magnetic bearing devices are used, for example, for turbo molecular pumps, ultra-centrifuges, high-speed spindles for machine tools and X-ray tubes with rotating anodes; they are also known to be used for motors, generators, turbines and compressors.

The basic design of a corresponding bearing device 30 is sketched in FIG. 1. The figure shows two active radial bearings 31 and 32 with excitation magnets 33 and 34 and radial bearing rotor disks 35 and 36 on a rotor shaft 37, an active axial bearing 38 with axial bearing rotor disks 39 and 40 on the rotor shaft 37 and concentric field windings 42$i$ on the rotor disks, as well as five distance sensors 41$a$ to 41$e$ corresponding to the in each case two lateral degrees of freedom per radial bearing and the single degree of freedom of the axial bearing. Furthermore, five associated control loops r1 to r4 and z5 are required. Because the attraction forces increase as the bearing gap becomes smaller in a bearing device such as this, corresponding devices are non-stationary from the start. The position of the rotor shaft 37 must therefore be stabilized by the control loops, comprising distance measurement by the sensors 41$a$ to 41$e$ with a downstream regulator and downstream amplifier, which feeds the excitation magnets 33 and 34. Corresponding bearing devices are accordingly complex. In addition, a mechanical holding bearing must be provided as a precaution against sudden failure of a control loop.

Magnetic bearing devices with permanent magnets and high-$T_c$ superconductor material are also known, for example from DE 44 36 831 C2. Bearing devices such as these are intrinsically stable, that is to say they do not require regulation. However, because of the required cryogenic operating temperature for the superconductor material, in particular of below 80 K, thermal insulation and a refrigerant supply are required by an appropriate cryogenic coolant or by a refrigeration machine.

The related art also includes bearing devices which are intrinsically stable in one direction with a magnetic flux, soft-magnetic parts such as those composed of iron, and with permanent magnets. In corresponding embodiments of bearing devices such as these, such as those disclosed in DE 34 09 047 A1 and the initially cited DE 38 44 563 C2, the permanent magnet rings on a shaft are axially primarily aligned with the poles of an iron yoke, and thus provide radial centering. In this case, the magnetic flux is enhanced by field coils, in which case the axially unstable degree of freedom may be stabilized by an electronic control loop. In this case, a plurality of stationary and rotating ring magnets, which alternate axially one behind the other, are arranged in a row or rows with the same axial magnetization and provide a radial bearing function. In this case as well, the axial degree of freedom must be actively stabilized.

All the bearing devices mentioned above and having permanent-magnet parts have relatively low supporting force and inadequate bearing stiffness, however.

SUMMARY

An aspect is to specify a magnetic bearing device for a non-contacting bearing for a shaft, in particular for a high-speed machine such as a turbocompressor, which is less complex than the stated related art. One particular aim is to ensure a good supporting force and high bearing stiffness while taking account of dynamic forces and tight gap tolerances.

Accordingly, in the case of the device for magnetic bearing of a rotor shaft with respect to a stator, the following features are intended to be provided, specifically:
- a first bearing part is connected to the rotor shaft and is surrounded by a second bearing part, which is associated with the stator, with a distance between them,
- the first bearing part contains soft-magnetic rotor disk elements which are aligned at right angles to the axis of the rotor shaft, are arranged one behind the other in the direction of the rotor shaft axis and are each separated, forming an intermediate space,
- the second bearing part contains soft-magnetic stator disk elements, which are aligned at right angles to the rotor shaft axis, are arranged one behind the other in the direction of this axis, are at a distance from one another and each project into one of the intermediate spaces of adjacent rotor disk elements,
- the rotor disk elements and the stator disk elements are designed on their respectively mutually facing sides to form annular tooth-like projections which are each opposite one another separated by an air gap,
- for radial guidance, the stator disk elements have associated magnetic-field-generating means for generating a magnetic holding flux which is directed essentially in the axial direction between the rotor disk elements and the stator disk elements, and at least one fixed-position winding of an electromagnet is additionally provided for axial control in the area of the center plane and is intended to produce a magnetic control flux which can be superimposed on the magnetic holding flux such that the flux densities of the control flux and of the holding flux are additively superimposed on one side of the rotor disk elements and are subtractively superimposed on the respectively opposite side.

For uncontrolled radial guidance and bearing in the case of the bearing apparatus described herein, in contrast to the related art, the external magnetic-field-generating means produce a magnetic holding flux across the respective air gap and magnetize the tooth-like projections composed of soft-magnetic material, in particular material containing iron. In this case, the magnetic flux density in the respective gap is inhomogeneous, so that forces are existed on the iron surface. In this case, considerably greater magnetization, and therefore a greater bearing force per unit area can advantageously be achieved in material containing iron than by arrangements composed of permanent-magnet material such as neodymium-iron-boron (Nd—Fe—B) on its own.

Based on the reluctance principle, the system tries to minimize the magnetic reluctance and to align the tooth-like projections such that they are as closely opposite one another as possible. The tooth-like projections are then exactly opposite one another when in the equilibrium position; in the event of any radial deflection, the magnetic holding forces produce a proportional resetting force, which means that there is no longer any need for radial regulation.

The maximum radial force is applied on movement through half the width of a tooth-like projection. Since the length scale is governed by the radial width of tooth-like projections and of intermediate spaces between them, the bearing stiffness can be selected within wide limits by the dimensions of the tooth-like projections. In particular, very stiff bearing apparatuses can be produced by fine structuring of the tooth-like projections. In the case of a symmetrical arrangement with identical bearing gaps on both sides, the axial forces on the rotor disk elements cancel one another out. However, this equilibrium is axially unstable and must be stabilized by additional means such as actively controlled axial bearing parts. However, only a single control loop is now required for a single axial bearing per shaft, instead of five as in the case of the related art with actively regulated radial bearings.

On the other hand, a considerable magnetic steady-state axial force can be applied without any need for electrical power by a slight axial movement, so that the axial bearing has to absorb only the dynamic component of the axial load.

This can be achieved by adjustment of axial bearing regulation, by predetermining a minimum value of the temporal mean value of the magnetic flux of the axial bearing as a nominal value. Appropriate axial control is integrated in the bearing apparatus. In this case, an attraction force density $<B>^2/2\mu_0$ additionally acts at right angles to the iron surfaces, independently of the tooth-like projections. In this case, $<B>$ is the mean value of the flux density, which is normally the same in the bearing gaps on both sides of a rotor disk element, so that the axial forces cancel one another out. This equilibrium is disturbed by reducing $<B>$ by $\Delta B$ on one side of a rotor disk element, and by reducing it in a corresponding manner on the other side. This therefore results in a net force density of $\pm 2\cdot\Delta B\cdot<B>$ which is used for desired axial position control and force development.

This is achieved by a combination of magnetic circuits for a predetermined magnetic holding flux and a control flux which can be influenced by the coil current. The two flux densities in the bearing gaps are additively superimposed on one side of each rotor disk element, that is to say the force is increased, and are subtractively superimposed in each case on the other side, thus in this case reducing the flux density and the force. This results in a net axial force proportional to the control flux.

A magnetic bearing apparatus designed is therefore distinguished by stable, uncontrolled radial guidance and single axial control, which can be carried out in a simple manner.

The apparatus can accordingly additionally have the following features:

Axially extending soft-magnetic material can therefore be provided outside the intermediate spaces between the disk elements, on their radial inner face and outer face, in order to close the magnetic flux circuits. In this case, in particular, the soft-magnetic material may be provided by an axially running outer yoke body and/or by at least parts of the rotor shaft. Parts such as these composed of soft-magnetic material allow the magnetic resistance of the magnetic flux circuit to be reduced, so that this makes it possible to appropriately increase the flux density between the tooth-like projections and in consequence allows improved magnetic stiffness to be achieved.

The magnetic-field-generating means for generation of the holding flux may advantageously be permanent-magnet elements, in which case these elements can be integrated at least in some of the rotor disk elements and/or of the stator disk elements. Corresponding bearing devices are relatively compact to construct.

In this case, these permanent magnet elements can advantageously each be arranged between two axially halves of a stator disk element.

In order to achieve high flux densities between the disk elements and effective use of the permanent magnet material, it is advantageous for the stator disk elements provided with the permanent magnet elements to have a greater extent radially than the adjacent rotor disk elements without permanent magnet elements.

Instead of using permanent magnet means for generation of the holding flux, or in addition to this, it is advantageously possible to provide for these magnetic-field-generating means to be formed by at least one winding on an electromagnet. In this case, this at least one magnet winding for generating the holding flux in each bearing half may in each case surround at least some of the rotor disk elements, at a distance from them.

In addition, the at least one winding of the electromagnet may either surround a central rotor disk element, which carries the magnetic holding flux and the magnetic control flux, at a distance, in order to generate the magnetic or may surround the outer face, which carries the magnetic field, of the rotor shaft, without touching it.

The mutually facing flat faces of the rotor disk elements and of the stator disk elements which are provided with the tooth-like projections are preferably arranged at an angle to a perpendicular to the rotor shaft axis. An inclination such as this results in wedge-shaped longitudinal section element forms. The axial extent (or disk thickness) and the inclination angle are in this case chosen such that the disk elements can absorb the magnetic flux everywhere, without becoming magnetically saturated.

In order to completely ensure axial control, at least one axial distance sensor must be provided, with a nominal-value transmitter and a regulator with an amplifier in order to control an electric current through the at least one control magnet winding in order to generate the magnetic control flux.

BRIEF DESCRIPTION OF THE DRAWINGS

Further advantageous refinements of the magnetic bearing apparatus according the invention are specified in the dependent claims which have not been mentioned above, and will become evident from the drawing. In order to explain the invention further, reference is made in the following text to the drawing, which illustrates embodiments of magnetic bearing apparatuses according to the invention. In this case, in each case in the form of an axial longitudinal section, These and other aspects and advantages will become more apparent and more readily appreciated from the following description of the exemplary embodiments, taken in conjunction with the accompanying drawings of which:

DETAILED DESCRIPTION OF THE PREFERRED EMBODIMENT

Reference will now be made in detail to the preferred embodiments, examples of which are illustrated in the accompanying drawings, wherein like reference symbols refer to like elements throughout.

Figure 2:
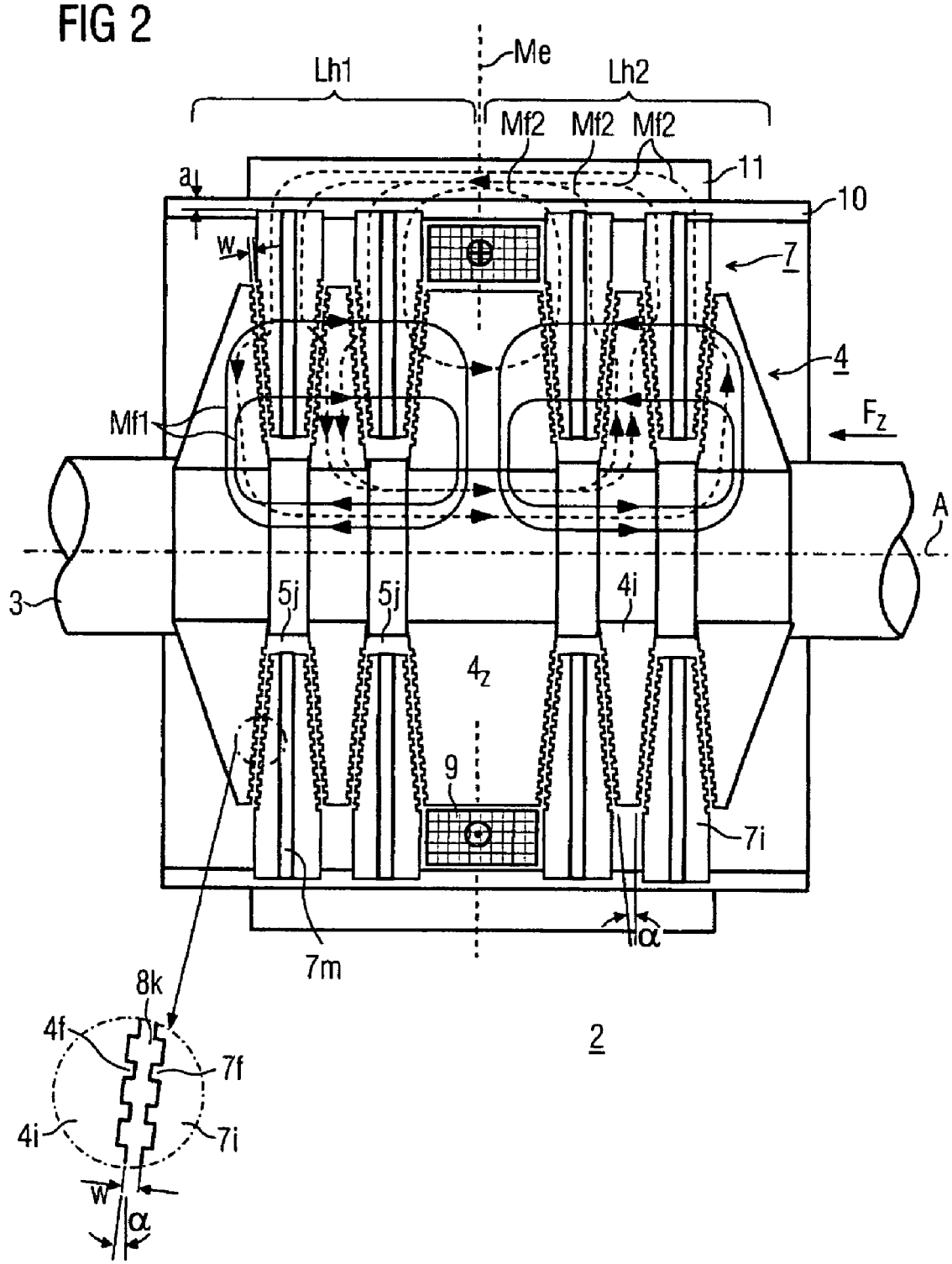
FIG. 2 is a cross section of a first embodiment of a magnetic bearing apparatus with permanent magnets as magnetic-field-generating means for radial guidance.

The magnetic bearing apparatus which is illustrated in FIG. 2, and is annotated 2 in general, is designed to be symmetrical with respect to a center plane Me, with two bearing halves Lh1 and Lh2. The apparatus has a rotor shaft 3, which is intended to be borne without contact, with a first bearing part 4 which also rotates, and has rotor disk elements 4$i$ which also rotate, are aligned at right angles to the axis A of the rotor shaft in each bearing half, are attached to the axis A and are composed of soft-magnetic material such as iron. The rotor disk elements 4$i$ are arranged at a distance one behind the other in the axial direction in order to form intermediate spaces 5$j$ between each of them. In the area of the center plane Me, a central rotor disk element 4$z$, which is likewise composed of soft-magnetic material, is fitted to the rotor shaft 3, with this element having a longer axial extent than the rotor disk elements 4$i$ in the two bearing halves.

A fixed-position stator for the magnetic bearing apparatus 2 forms a second bearing part 7, with stator disk elements 7$i$ which are likewise axially at a distance from one another, are in the form of annular disks and surround the rotor shaft 3 at a distance. These stator disk elements, likewise composed of soft-magnetic material, project radially into the intermediate spaces 5$j$ without touching, thus resulting in an axially alternating, comb-like arrangement of rotor disk elements 4$i$ and stator disk elements 7$i$ in each bearing half Lh1, Lh2. The rotor disk elements and the stator disk elements are provided on their respectively mutually facing flat faces with concentrically surrounding, annular tooth-like projections 4$f$ and 7$f$, respectively, or are designed to form such projections.

For example, these tooth-like projections are produced by incorporating annular, concentric grooves or slots in the two opposite flat faces of corresponding iron disks. The tooth-like projections on both disk elements are opposite one another, with a small air gap 8$k$ between them in each case.

The stator disk elements 7$i$ have associated means for generating an axial magnetic flux across the air gap 8$k$ between the rotor disk elements and the stator disk elements. The lines of force of this magnetic flux are indicated by solid lines in the figure, and are annotated Mf1. In this case, the system attempts to minimize the magnetic reluctance, on the basis of the reluctance principle, and attempts to align the tooth-like projections such that they are exactly opposite one another, when in an equilibrium position. However, in the event of any radial deflection, the magnetic forces produce a proportional resetting force; that is to say there is no need for radial control. The magnetic flux which is used for this radial guidance and bearing of the rotor shaft 3 with its parts fitted to the rotor shaft 3, in particular parts which carry magnetic flux, can therefore also be referred to as a "radial holding flux".

According to the exemplary embodiment in FIG. 2, each stator disk element 7$i$ is axially subdivided into two halves in order to generate this holding flux Mf1, between which a radially extending layer or annular disk 7$m$ composed of a permanent-magnet material, in particular such as NdFeB, is located. In this case, the stator disk elements 7$i$ advantageously occupy a greater axial extent than their grooved active surface with the tooth-like projections 7$f$. This allows flux densities in particular of 1 Tesla or more to be achieved in the air gaps 8$k$, and the magnetic material can be operated at an operating point, for example between 0.5 and 0.8 Tesla, by using NdFeB with a high energy product B·H.

As can also be seen from FIG. 2, the mutually facing flat faces of the rotor disk elements 4$i$ and 4$z$ which are provided with the tooth-like projections 4$f$ and 7$f$, on the one hand and the stator disk elements 7$i$ on the other hand may also be arranged at an angle, thus resulting in trapezoidal cross-sectional shapes. An angle such as this allows the iron thickness to be matched to the local magnetic flux and therefore also makes it possible to limit the axial bearing length. The inclination angle $\alpha$ to the center plane Me should in this case be chosen such that no magnetically saturated areas occur in the disk elements, despite the disk elements being wedge-shaped (when seen in the form of a longitudinal section). According to the illustrated exemplary embodiment, the angle $\alpha$ is between about 7° and 15°, for example about 10°.

In order to close the magnetic flux path Mf1 for radial guidance and bearing, rotor disk elements 4$e$ with grooves on one side are provided as flux guides at the end of the bearing halves Lh1 and Lh2 and, together with a ferromagnetic flux return path via the rotor shaft, at least whose outer surface is composed of ferromagnetic material, close the magnetic circuit.

As described above, a centering radial and decentering axial force effect is produced in the magnetic bearing apparatus 2 by virtue of the inhomogeneities of the magnetic field in the air gaps 8$k$ caused by the tooth-like projections 4$f$ and 7$f$ on the disk elements 4$i$ and 7$i$. Independently of the tooth-like projections, an attraction force density, whose magnitude is $<B>^2/2\mu_0$, additionally acts at right angles to the surfaces of the soft-magnetic parts in the bearing apparatus. In this case, the variable $<B>$ represents the mean value of the flux density, which is normally equal in the air gaps on both sides of a rotor disk element, so that the corresponding axial forces cancel one another out. However, the configuration of the magnetic bearing apparatus 2 disturbs this equilibrium by increasing the variable $<B>$ by a value $\Delta B$ on one side of the rotor disk, and by reducing it on the opposite side. This therefore results in a net force density of ±2·ΔB·<B>, which is used for axial bearing control and for force development relating to this.

This is achieved by a combination of magnetic circuits for the predetermined magnetic holding flux Mf1 mentioned and for a control flux Mf2 which can be influenced by a coil current. This control flux is produced by at least one additional control magnet winding 9, located in the area of the center plane Me, on an electromagnet. In this case, this winding surrounds the central rotor disk element 4z, which also rotates, without touching it. In conjunction with an outer yoke body 11, which surrounds the stator disk elements 7i on their outside like a sleeve, is separated from them via a nonmagnetic intermediate body 10, and is composed of ferromagnetic material, the control magnet winding 9 can then generate a magnetic control flux Mf2 which is superimposed on the holding magnetic flux Mf1, with the circuit likewise being closed via the rotor shaft 3, as indicated by dashed lines. The two flux densities are additively superimposed in the air gaps 8k on one side of each rotor disk element 4i, that is to say with the corresponding force being increased, while the two flux densities are subtracted on the opposite side, leading to a corresponding reduction in the force. This then results in a net axial force that is proportional to the control flux Mf2. The rotor shaft is then drawn by a force $F_z$ to the left, with the parts that are attached to it, by the field directions, which are shown by way of example in FIG. 2, of the holding flux Mf1 and of the control flux Mf2.

In order to prevent shorting of the carrier flux, the outer yoke body 11 for the control flux Mf2 is separated from the stator disk elements 7i by a distance a, with the magnitude of a generally being between 2 and 10 times the width w of the air gaps 8k. The intermediate body 10 composed of nonmagnetic material is used for this purpose.

Figure 3:
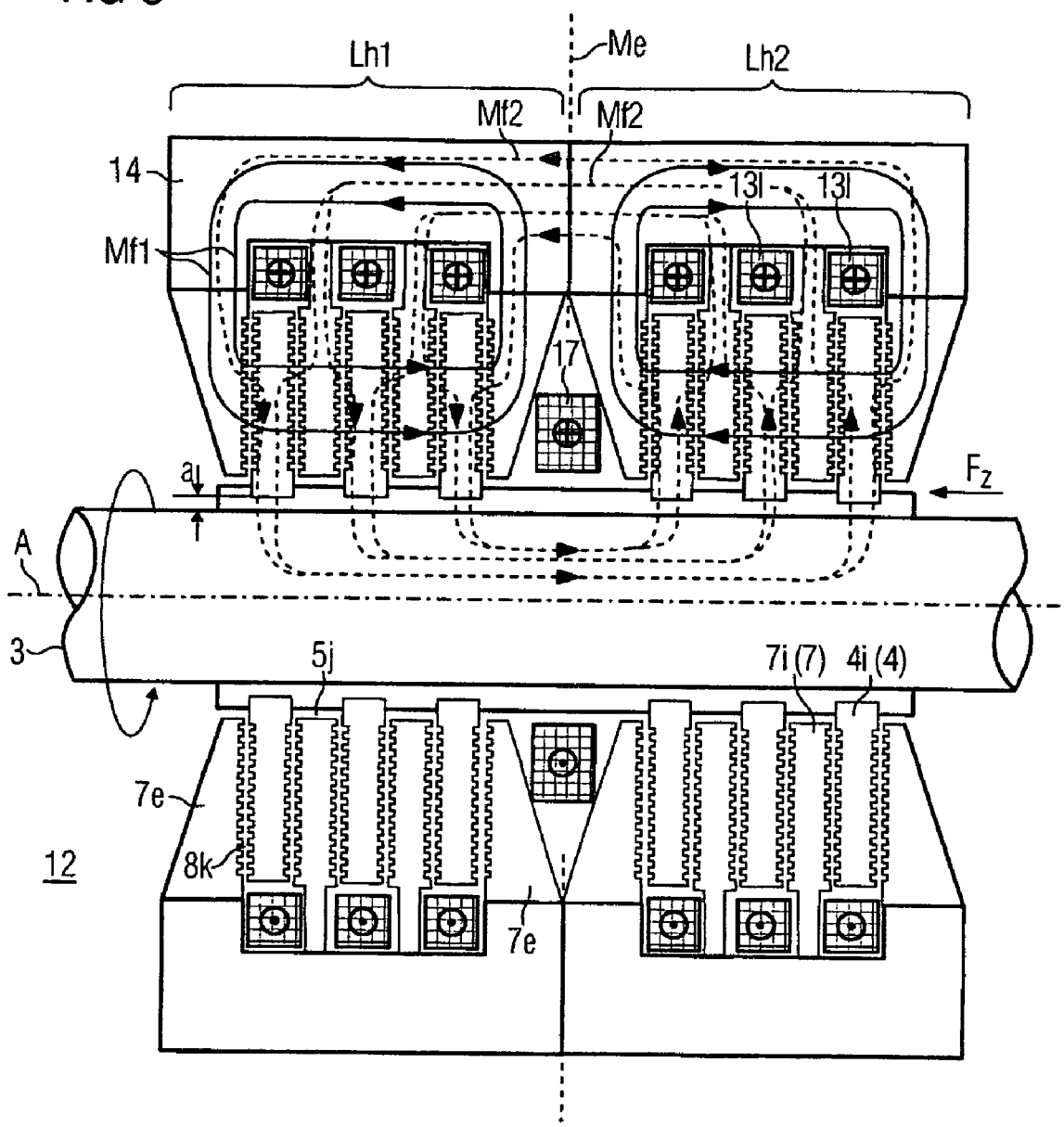
FIG. 3 is a cross section of a second embodiment of a magnetic bearing apparatus with field-magnet windings as magnetic-field-generating means for radial guidance.

Instead of the use of permanent-magnet elements as magnetic-field-generating means, as assumed for the embodiment of the magnetic bearing apparatus 2, windings on electromagnets can also just as well be provided in order to generate the magnetic holding flux Mf1. FIG. 3 shows a corresponding embodiment in the form of an illustration corresponding to the magnetic bearing apparatus shown in FIG. 2, and is annotated 12 in general. In this case, fixed-position windings 131 on an electromagnet are arranged in the area of the radial outer face of the rotor disk elements 4i which also rotate, with the stator disk elements 7i extending radially between the individual magnet windings 131, and through them. The magnetic flux circuit for the holding flux Mf1 is closed via an outer yoke body 14, on which the radial outer face of the stator disk elements 7i in each case rests directly. The rotor shaft 3 is in this case admittedly likewise composed of magnetic material. However, in order to avoid adversely affecting the closing of the magnetic flux circuit for the holding flux Mf1 via the outer yoke body 14, the individual rotor disk elements 4i are magnetically decoupled from the rotor shaft 3 via a sleeve-like intermediate body 15, with a radial extent a and composed of nonmagnetic material. In this case as well, the magnitude of a is chosen as in the embodiment shown in FIG. 2.

In the embodiment of the magnetic bearing apparatus 12 shown in FIG. 3, the magnetic control flux Mf2 is likewise produced by a fixed-position winding 17 on an electromagnet. This control magnet winding 17 is in this case, however, located in an area of the center plane Me close to the rotor shaft, in order not to impede the profile of the lines of force of the holding flux Mf1. There is therefore no central rotor disk element in this area either. The circuit for the control flux Mf2 is in this case closed close to the axis via the rotor shaft 3 and remotely from the axis via stator disk elements 7e, which rest on one another in the area of the center plane Me there, and the outer yoke body 14.

The above embodiments of magnetic bearing apparatuses 2 and 12 have been based on the assumption that the magnetic-field-generating means for generating the magnetic holding flux Mf1 are either permanent-magnet elements 7m or windings 131 on at least one field magnet. A combination of permanent magnet elements and windings on electromagnets is, of course, also possible in order to generate the desired axial holding flux Mf1 via the tooth-like projections 4f and 7f.

The magnetic bearing apparatuses 2 and 12 may, of course, also be operated aligned such that their rotor shaft axis A is not horizontal but is inclined at an angle, or is vertical.

The advantage of the design of the magnetic bearing apparatuses described herein is the lack of a separate axial bearing for a shaft bearing. The magnetic axial field of the radial bearing function in this case has a linearizing effect on the current/force characteristic of the axial position control. The power consumption for control purposes can be kept low by minimizing the current level in the control concept.

This is often also associated with a corresponding simplification of cooling for the bearing apparatus.

Figure 1:
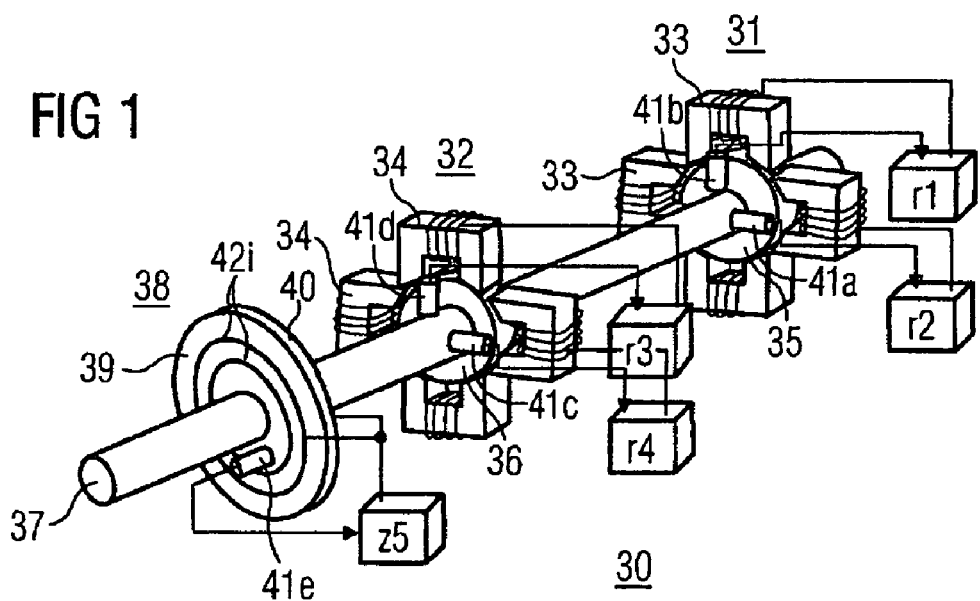
FIG. 1 is a simplified perspective view of a bearing device.
Figure 4:
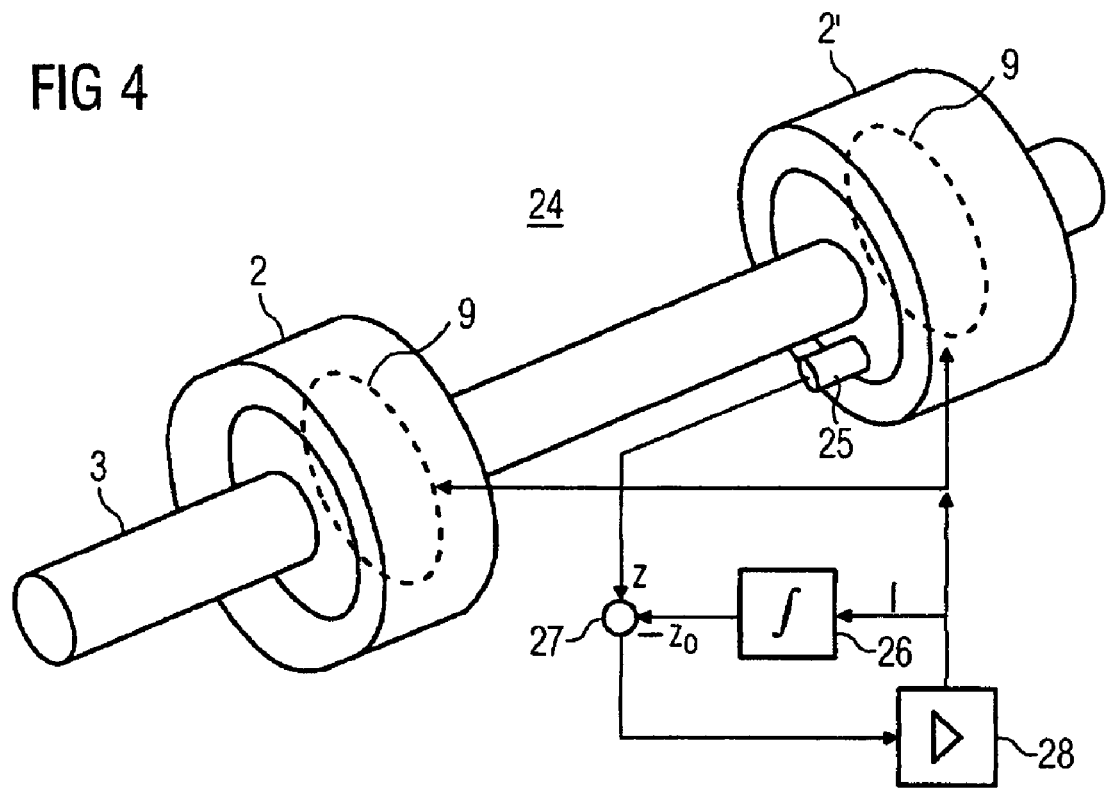
FIG. 4 is a combined perspective view of a complete magnetic bearing with radial guidance and axial control.

A rotor shaft 3 which is held by one or two such magnetic bearing apparatuses can be held without contact by an axial position control system. A corresponding magnetic bearing 24 which, for example, is equipped in the following text with two identically constructed magnetic. bearing apparatuses 2 and 2' as shown in FIG. 2, contains, according to the control block diagram illustrated in FIG. 4, at least one distance sensor 25, a nominal-value transmitter 26, a comparison circuit 27 and a regulator device 28 with a downstream amplifier. This amplifier controls the axial control winding of the one, but preferably two, magnetic bearing apparatuses in series and maintains an axial nominal position. In contrast to known magnetic bearing apparatuses, in which the force is proportional to $B^2$, the force/current characteristic in this case is virtually linear; that is to say the force direction is also reversed if the current is reversed. This simplifies the design and stability of the control system. By way of example, the mid-position of the rotor disk elements 4i between the adjacent stator disk elements 7i may be predetermined as a fixed nominal value $z_0$ for the axial position z. However, another objective is advantageously added to the control system, on the basis of which the mean value of the coil current over time should be close to zero. As is also indicated in the block diagram in FIG. 4, the integral of the magnet current is used for this purpose, multiplied by a scaling factor as a position nominal value $z_0$, compared with the actual position z from the distance sensor 25, in the comparison circuit device 27. The difference is fed back to the current as a control error, via the regulator device 28 with the amplifier. This results in an axially shifted, asymmetric position of the rotor disk elements. A steady-state axial load on the rotor shaft 3 is then applied essentially without any power by the axial magnetic forces by virtue of the interaction between the opposite tooth-like projections 4f and 7f. The axial control loop now has to compensate just for the forces, which are variable over time, and to ensure the axial stability.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An apparatus for a magnetic bearing of a rotor shaft having an axis and a stator, comprising:
    a first bearing part, connected to the rotor shaft, containing soft-magnetic rotor disk elements aligned at right angles to the axis of the rotor shaft, arranged one behind another in a direction of the rotor shaft axis and each separated to form an intermediate space;
    a second bearing part, associated with the stator, surrounding said first bearing part with a distance between said second bearing part and said first bearing part, said second bearing part containing soft-magnetic stator disk elements aligned at right angles to the axis of the rotor shaft, arranged one behind another in the direction of the axis of the rotor shaft, separated from one another and each projecting into one of the intermediate spaces between adjacent rotor disk elements, said first and second bearing parts each subdivided into two bearing halves symmetrically with respect to a center plane at right angles to the axis of the rotor shaft, the rotor disk elements and the stator disk elements having on respectively mutually facing flat sides, annular tooth-like projections which are each opposite one another separated by an air gap;
    magnetic-field-generating means, associated with the stator disk elements, for generating a magnetic holding flux directed essentially in an axial direction across the air gaps, thereby providing radial guidance of the rotor shaft; and
    at least one fixed-position winding of an electromagnet providing axial control in an area of the center plane and producing during operation a magnetic control flux superimposed on the magnetic holding flux such that the flux densities of the control flux and of the holding flux are additively superimposed on one side of the rotor disk elements and are subtractively superimposed on the respectively opposite side, wherein
    all of the rotor disk elements and the stator disk elements have trapezoidal cross-sectional shapes.

2. The magnetic bearing apparatus as claimed in claim 1, further comprising axially extending soft-magnetic material outside the intermediate spaces between the rotor and stator disk elements on radial inner and outer faces thereof, to close magnetic flux circuits.

3. The magnetic bearing apparatus as claimed in claim 2, wherein said soft-magnetic material includes at least one of an axially running outer yoke body and at least parts of the rotor shaft.

4. The magnetic bearing apparatus as claimed in claim 3, wherein said magnetic-field-generating means comprises permanent-magnet elements.

5. The magnetic bearing apparatus as claimed in claim 4, wherein said permanent-magnet elements are integrated in at least some of the stator disk elements.

6. The magnetic bearing apparatus as claimed in claim 5, wherein the stator disk elements are each subdivided axially into two halves, between which the permanent-magnet elements are arranged.

7. The magnetic bearing apparatus as claimed in claim 6, wherein the stator disk elements have a greater extent radially than the rotor disk elements without permanent-magnet elements.

8. The magnetic bearing apparatus as claimed in claim 3, wherein said magnetic-field-generating means comprises at least one electromagnet winding.

9. The magnetic bearing apparatus as claimed in claim 8, wherein the at least one electromagnet winding surrounds the rotor disk elements at a predetermined distance to generate the magnetic holding flux.

10. The magnetic bearing apparatus as claimed in claim 3, wherein the at least one fixed-position winding surrounds a central rotor disk element, which carries the magnetic holding flux and the magnetic control flux in the area of the center plane, at a predetermined distance to generate the magnetic control flux.

11. The magnetic bearing apparatus as claimed in claim 8, wherein the at least one fixed-position winding surrounds the rotor shaft at a predetermined distance to generate the magnetic control flux.

12. The magnetic bearing device as claimed in claim 3, wherein the mutually facing flat faces of the rotor disk elements and stator disk elements which are provided with the tooth-like projections are arranged at a non-perpendicular angle to the axis of the rotor shaft.

13. The magnetic bearing apparatus as claimed in claim 3, further comprising:
    at least one axial distance sensor;
    a nominal-value transmitter;
    a comparison circuit device, coupled to said at least one axial distance sensor and said nominal-value transmitter; and
    a regulator device, coupled to said comparison circuit device and including a down-stream amplifier, controlling an electric current through the at least one fixed-position winding to generate the magnetic control flux.

* * * * *